United States Patent
Wang et al.

(10) Patent No.: US 11,221,089 B2
(45) Date of Patent: Jan. 11, 2022

(54) OIL-RETAINING MECHANISM, VALVE STRUCTURE, AND WATER OUTFLOW DEVICE

(71) Applicant: Xiamen Lota International Co., Ltd., Fujian (CN)

(72) Inventors: Xuedong Wang, Fujian (CN); Zhiyong Li, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 7 days.

(21) Appl. No.: 16/926,968

(22) Filed: Jul. 13, 2020

(65) Prior Publication Data

US 2021/0010615 A1    Jan. 14, 2021

(30) Foreign Application Priority Data

Jul. 12, 2019    (CN) .......................... 201921096571.4

(51) Int. Cl.
   *F16K 41/04*    (2006.01)
   *F16N 31/00*    (2006.01)

(52) U.S. Cl.
   CPC .............. *F16K 41/04* (2013.01); *F16N 31/00* (2013.01); *E03C 2201/30* (2013.01)

(58) Field of Classification Search
   CPC ......... F16K 41/04; F16L 55/105; F16N 31/00
   See application file for complete search history.

(56) References Cited

U.S. PATENT DOCUMENTS

| | | | |
|---|---|---|---|
| 2003/0068105 A1* | 4/2003 | Chen ..................... | F16C 33/103 384/279 |
| 2005/0186088 A1* | 8/2005 | Chou .................. | F04D 25/0626 417/354 |
| 2012/0002908 A1* | 1/2012 | Zhang .................. | H02K 5/1672 384/223 |
| 2012/0014630 A1* | 1/2012 | Jiang ..................... | F16C 33/106 384/291 |
| 2012/0134864 A1* | 5/2012 | Lee ..................... | F04C 29/0085 418/66 |
| 2014/0112701 A1* | 4/2014 | Chen ..................... | B23Q 5/326 403/52 |
| 2015/0260220 A1* | 9/2015 | Owada .................. | F16C 29/045 384/53 |

* cited by examiner

*Primary Examiner* — Kevin R Barss
(74) *Attorney, Agent, or Firm* — Cooper Legal Group, LLC

(57) ABSTRACT

The present disclosure discloses an oil-retaining mechanism, a valve structure, and a water outflow device. The oil-retaining mechanism comprises a valve body, a valve shaft, and a sealing member. The valve body comprises a motion cavity. The valve shaft is disposed in the motion cavity and configured to move axially. The sealing member is disposed between a cavity wall of the motion cavity and the valve shaft. At least one of the cavity wall of the motion cavity, the sealing member, or a connection portion of the motion cavity, the sealing member, and the valve shaft extends inward to define an oil storage groove. The oil storage groove comprises an opening. An inner side of the opening stores lubricating oil. The opening cooperates with and contacts the outer circumferential surface of the valve shaft. When the valve shaft moves in the motion cavity, the lubricating oil lubricates the valve shaft.

13 Claims, 4 Drawing Sheets

OIL-RETAINING MECHANISM, VALVE STRUCTURE, AND WATER OUTFLOW DEVICE

RELATED APPLICATION

This application claims priority to Chinese Patent Application 201921096571.4, filed on Jul. 12, 2019. Chinese Patent Application 201921096571.4 is incorporated herein by reference.

FIELD OF THE DISCLOSURE

The present disclosure relates to an oil-retaining mechanism and a valve structure, and in particular relates to an oil-retaining mechanism and a valve structure of a water outflow device.

BACKGROUND OF THE DISCLOSURE

Existing valve shafts, especially a valve shaft in a valve structure of a water outflow device, can axially move relative to a valve body or a sealing member. A reset elastic member is configured to reset the valve shaft. After being repeatedly used, friction between the valve shaft and the sealing member or friction between the valve shaft and the valve body increases, which not only makes switching feel unstable, but also causes the reset elastic member to fail to reset the valve shaft, resulting in the valve structure as a whole being invalid or not operating as intended. Especially in a case of a low water pressure, the water pressure is insufficient to provide support to the reset member, making it more difficult to reset the valve shaft.

BRIEF SUMMARY OF THE DISCLOSURE

The present disclosure provides an oil-retaining mechanism and a valve structure, which overcome the deficiencies of existing techniques.

In order to solve the aforementioned technical problems, a first technical solution of the present disclosure is as follows.

An oil-retaining mechanism comprises a valve body, a valve shaft, and a sealing member. The valve body comprises a motion cavity. The valve shaft is disposed in the motion cavity, and the valve shaft is at least configured to move axially in the motion cavity. The sealing member is disposed between a cavity wall of the motion cavity and the valve shaft. At least one of the cavity wall of the motion cavity, the sealing member, or a connection portion of the motion cavity, the sealing member, and the valve shaft extends inward to define an oil storage groove. The oil storage groove comprises an opening, and an inner side of the opening stores lubricating oil. The opening cooperates with and contacts an outer circumferential surface of the valve shaft. When the valve shaft moves in the motion cavity, the lubricating oil lubricates the valve shaft.

In a preferred embodiment, the opening of the oil storage groove contacts the outer circumferential surface of the valve shaft.

In a preferred embodiment, the oil storage groove comprises an upper groove wall and a lower groove wall, and the opening is defined between the upper groove wall and the lower groove wall. When the valve shaft moves upward along the motion cavity, the upper groove wall pushes the lubricating oil from the outer circumferential surface of the valve shaft into the oil storage groove. When the valve shaft moves downward along the motion cavity, the lower groove wall pushes the lubricating oil from the outer circumferential surface of the valve shaft into the oil storage groove.

In a preferred embodiment, a cross section of the oil storage groove is a closed annular structure, and the opening has a closed annular shape.

In a preferred embodiment, a longitudinal section of the oil storage groove has a circle shape, a triangle shape, a square shape, a diamond shape, a trapezoid shape, or an ellipse shape.

In a preferred embodiment, the motion cavity comprises a step surface laterally disposed, and the step surface divides the motion cavity into a large cavity and a small cavity. A bottom end of the valve shaft passes through the motion cavity and extends out of the motion cavity. The sealing member is disposed between an inner wall of the large cavity and the valve shaft, and the oil storage groove is disposed on the stepped surface.

A second technical solution of the present disclosure is as follows.

A valve structure comprises the oil-retaining mechanism and a valve fixed portion. The valve fixed portion comprises an assembly cavity, and the valve body is disposed on the assembly cavity. The valve shaft is configured to move relative to the valve fixed portion.

In a preferred embodiment, the valve structure further comprises a reset elastic member. The reset elastic member is disposed in the assembly cavity, and two ends of the reset elastic member are respectively connected to a bottom wall of the assembly cavity and the valve shaft.

A third technical solution of the present disclosure is as follows.

A water outflow device comprising the valve structure.

Compared with existing techniques, the technical solution of the present disclosure has the following advantages.

1. The oil storage groove comprises an opening, and the opening stores lubricating oil. The opening cooperates with and contacts the outer circumferential surface of the valve shaft. The lubricating oil disposed in the oil storage groove always contacts the outer circumferential surface of the valve shaft through the opening. When the valve shaft moves, friction between the valve shaft and the valve body or friction between the valve shaft and the sealing member is reduced due to the lubricating oil. Therefore, the switching feels smooth and the reset elastic member can be effectively used. At the same time, the opening of the oil storage groove cooperates with the outer circumferential surface of the valve shaft, so that the lubricating oil lubricates the valve shaft (e.g., without leaking from the oil storage groove). As determined from a life-cycle test of the structure, the lubricating oil disposed in the oil storage groove is always preserved in the oil storage groove. Therefore, the oil-retaining mechanism always has a lubricating effect on the valve shaft.

2. The opening of the oil storage groove contacts the outer circumferential surface of the valve shaft to ensure that the outer circumferential surface of the valve shaft has a sufficient amount of lubricating oil to achieve a better lubricating effect.

3. When the valve shaft moves upward or downward along the motion cavity, the lower groove wall or the upper groove wall will push the lubricating oil from the outer circumferential surface of the valve shaft into the oil storage groove. Therefore, when the valve shaft moves, the upper groove wall or the lower groove wall of the oil storage groove pushes the lubricating oil into the oil storage groove, so that the lubricating oil can be recycled without an additional recycling structure. The structure is simple, and a recycling effect is good.

4. The cross section of the oil storage groove is a closed annular structure and the opening has a closed annular shape, which increases a contact area with the valve shaft to improve the lubrication effect of the valve shaft.

5. The longitudinal section of the oil storage groove has a circle shape, a triangle shape, a square shape, a diamond shape, a trapezoid shape, or an ellipse shape, or the longitudinal section of the oil storage groove can be designed as other shapes such as a regular polygon and is not limited thereto. A size of the longitudinal section of the oil storage groove relates to (i.e., is a function of) a size of the valve shaft or a size of the valve structure. If the size of the valve shaft or the size of the valve structure is large, the longitudinal section of the oil storage groove can be designed to be large.

BRIEF DESCRIPTION OF THE DRAWINGS

The present disclosure will be further described below with reference to the drawings and embodiments.

DETAILED DESCRIPTION OF THE EMBODIMENTS

Figure 1:
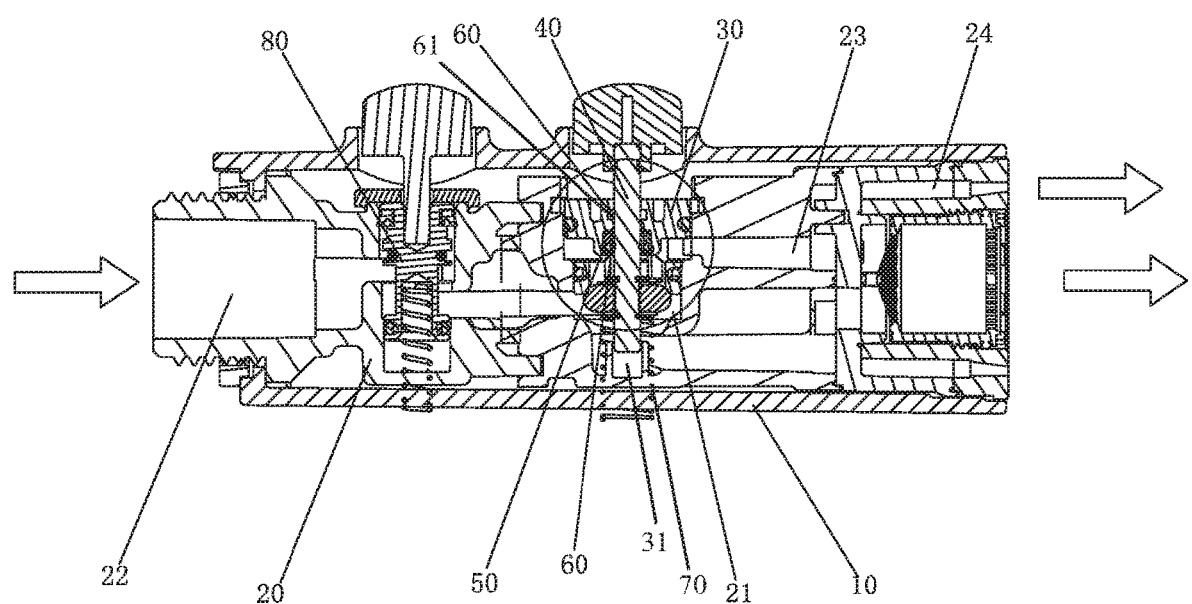
FIG. 1 illustrates a cross-sectional view of a water outflow device comprising an oil-retaining mechanism.

Referring to FIG. 1, in an embodiment of a water outflow device comprising an oil-retaining mechanism, the water outflow device can be a shower, a faucet, etc. In this embodiment, the water outflow device is a kitchen pull-out faucet, which comprises a pull-out faucet housing 10 and a valve structure disposed in the pull-out faucet housing 10.

The valve structure comprises a valve fixed portion 20 and an oil-retaining mechanism. The valve fixed portion 20 comprises an assembly cavity 21. As shown in FIG. 1, the valve fixed portion 20 further comprises a water inlet passage 22, a first water outlet passage 23, and a second water outlet passage 24.

The oil-retaining mechanism comprises a valve body 30, a valve shaft 40, and a sealing member 50. The valve body 30 comprises a motion cavity 31. The valve shaft 40 is disposed in the motion cavity 31 and at least moves axially in the motion cavity 31, and the sealing member 50 is disposed between a cavity wall of the motion cavity 31 and the valve shaft 40. The cavity wall of the motion cavity 31 and an inner side of the sealing member 50 both extend inward to define oil storage grooves 60. The oil storage grooves 60 have openings 61, and inner sides of the openings 61 store lubricating oil. When the valve shaft 40 moves in the motion cavity 31, the openings 61 cooperate with and contact an outer circumferential surface of the valve shaft 40 to enable the lubricating oil to lubricate the valve shaft 40 (e.g., without leakage). In the pull-out faucet, the valve shaft 40 is configured to switch the water inlet passage 22 to be connected to the first water outlet passage 23 or the second water outlet passage 24.

As shown in FIG. 1, the valve body 30 is fixedly connected to an inner side of the assembly cavity 21, and the valve shaft 40 is configured to move upward and downward relative to the valve fixed portion 20.

In this embodiment, the valve structure further comprises a reset elastic member 70. The reset elastic member 70 is disposed in the assembly cavity 21, and two ends of the reset elastic member 70 are respectively connected to a bottom wall of the assembly cavity 21 and the valve shaft 40.

As shown in FIG. 1, the pull-out faucet further comprises a switching valve shaft 80. The switching valve shaft 80 is disposed between the water inlet passage 22 and the valve shaft 40 to open or close the water inlet passage 22. This part (e.g., the switching valve shaft 80) is conventional.

Figure 2:
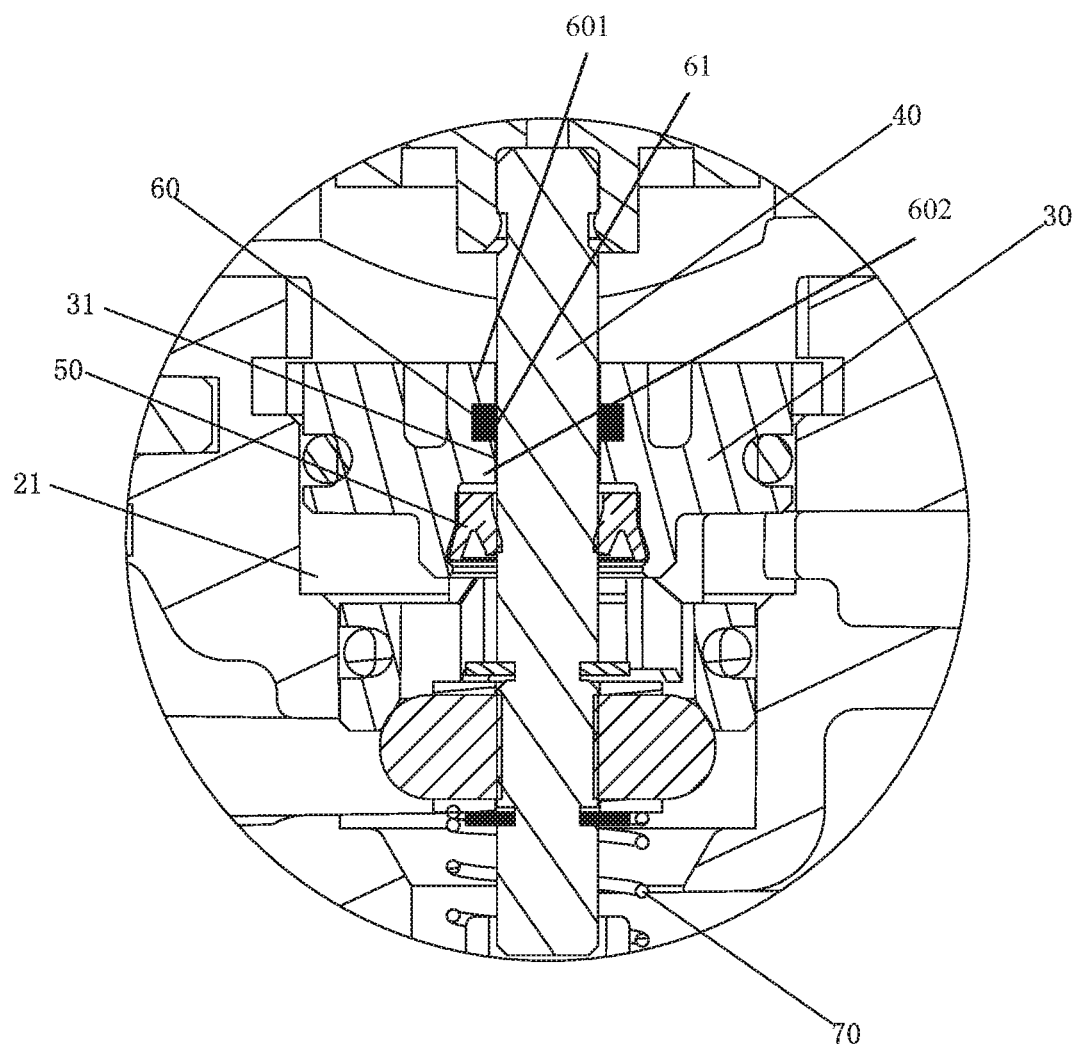
FIG. 2 illustrates an enlarged view of a portion of FIG. 1 when an oil storage groove is disposed on an inner wall of a motion cavity.

As shown in FIG. 2, in some embodiments, only the cavity wall of the motion cavity 31 comprises the oil storage groove 60.

In this embodiment, the opening 61 of the oil storage groove 60 contacts the outer circumferential surface of the valve shaft 40.

In this embodiment, the oil storage groove 60 comprises an upper groove wall 601 and a lower groove wall 602, and the opening 61 is defined between the upper groove wall 601 and the lower groove wall 602. When the valve shaft 40 moves upward along the motion cavity 31, the upper groove wall 601 pushes the lubricating oil from the outer circumferential surface of the valve shaft 40 into the oil storage groove 60. When the valve shaft 40 moves downward along the motion cavity 31, the lower groove wall 602 pushes the lubricating oil from the outer circumferential surface of the valve shaft 40 into the oil storage groove 60.

In this embodiment, a cross section of the oil storage groove 60 is a closed annular structure, and the opening 61 has a closed annular shape.

In this embodiment, a longitudinal section of the oil storage groove 60 has a square shape. As desired, a shape of the longitudinal section of the oil storage groove 60 can also be designed as a circle shape, a triangle shape, a diamond shape, a trapezoid shape, an ellipse shape, or a regular polygon shape, etc. However, it is not limited thereto.

Figure 3:
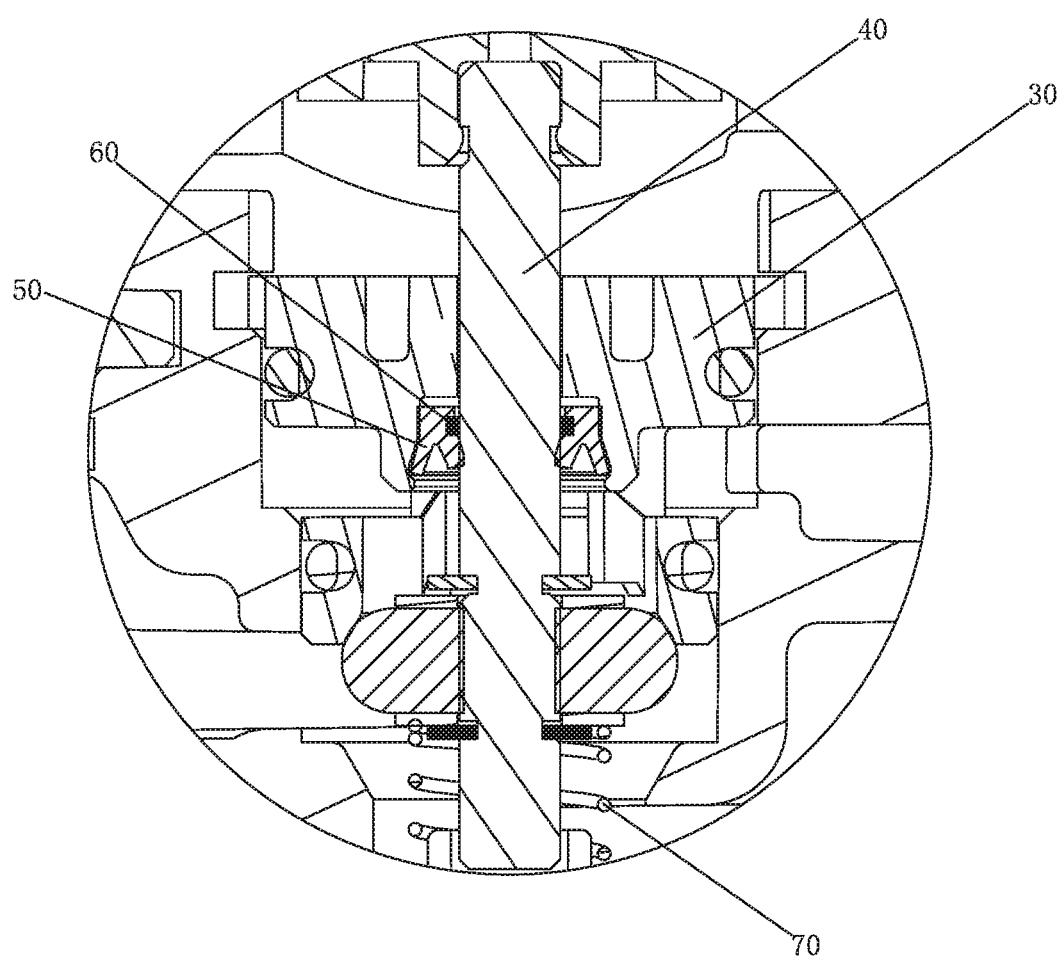
FIG. 3 illustrates an enlarged view of a portion of FIG. 1 when the oil storage groove is disposed in a sealing member.

As shown in FIG. 3, in some embodiments, only an inside of the sealing member 50 comprises the oil storage groove 60.

Figure 4:
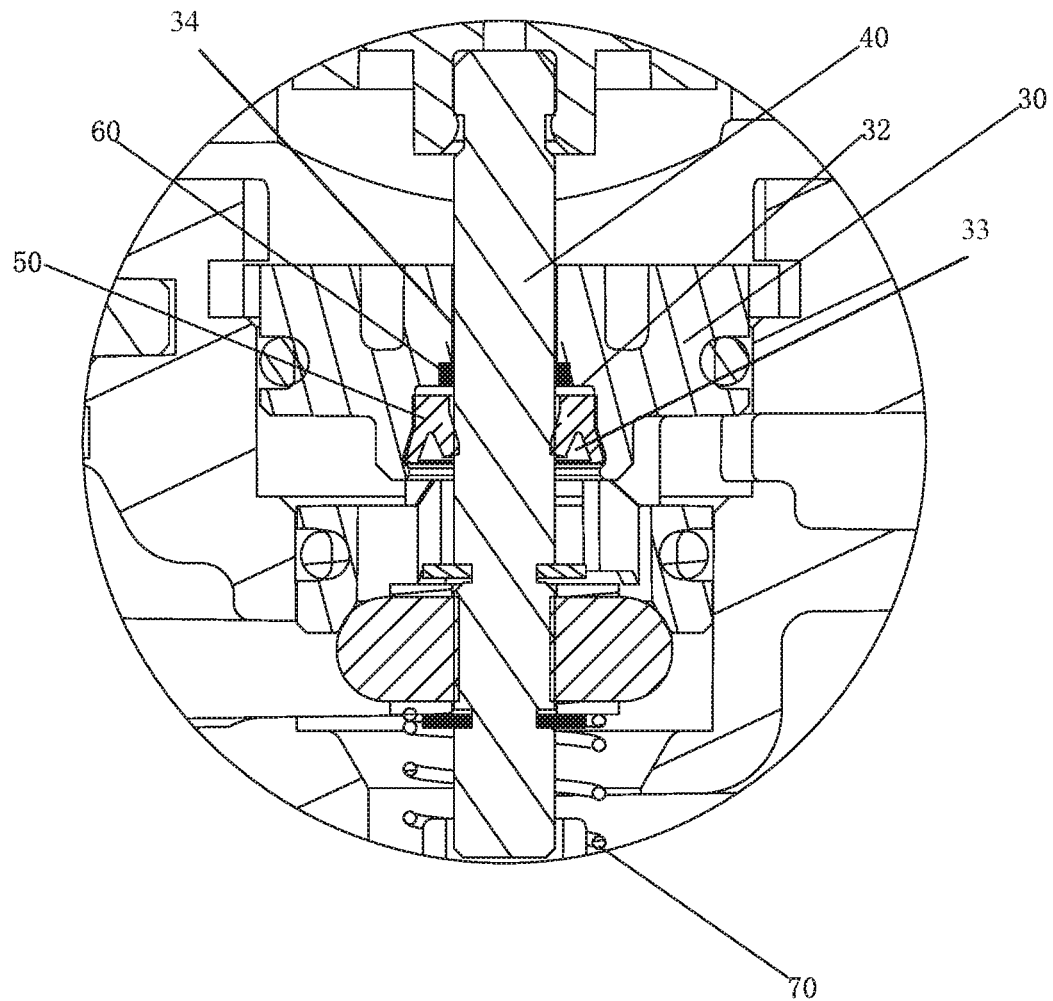
FIG. 4 illustrates an enlarged view of a portion of FIG. 1 when the oil storage groove is disposed on an assembly position of the motion cavity, the sealing member, and a valve shaft.

As shown in FIG. 4, in some embodiments, an inner side of the motion cavity 31 comprises a step surface 32 laterally disposed. The stepped surface 32 divides the motion cavity 31 into a large cavity 33 and a small cavity 34, and a bottom end of the valve shaft 40 passes through the motion cavity 31 and extends out of the motion cavity 31. The sealing member 50 is disposed between an inner wall of the large cavity 33 and the valve shaft 40, and the oil storage groove 60 is disposed on the stepped surface 32. That is, the oil storage groove 60 is disposed at a connection portion of the motion cavity 31, the sealing member 50, and the valve shaft 40.

As desired, a number of the oil storage grooves 60 of the pull-out faucet can be adjusted. For example, only one of the cavity wall of the motion cavity 31, the sealing member 50, or the connection portion of the motion cavity 31, the sealing member 50, and the valve shaft 40 comprises the oil storage groove 60. As another example, two of the cavity wall of the motion cavity 31, the sealing member 50, or the connection portion of the motion cavity 31, the sealing member 50, and the valve shaft 40 comprise the oil storage grooves 60. As another example, all three of the cavity wall of the motion cavity 31, the sealing member 50, and the connection portion of the motion cavity 31, the sealing member 50, and the valve shaft 40 comprise the oil storage grooves 60.

A working process of the oil-retaining mechanism is as follows.

The oil storage groove 60 comprises the opening 61. The opening 61 always cooperates with and contacts the outer circumferential surface of the valve shaft 40 to ensure that the outer circumferential surface of the valve shaft 40 corresponding to the opening 61 of the oil storage groove 60 always has the lubricating oil.

When pressing the valve shaft 40 downward, the lubricating oil on the outer circumferential surface of the valve shaft 40 can reduce a friction between the valve shaft 40 and the valve body 30 or a friction between the valve shaft 40 and the sealing member 50. At the same time, the lower groove wall 602 of the oil storage groove 60 can push the lubricating oil on the outer circumferential surface of the valve shaft 40 into the oil storage groove 60 to ensure that the lubricating oil is always in the oil storage groove 60.

Similarly, when pulling the valve shaft 40 upward, the lubricating oil on the outer circumferential surface of the valve shaft 40 can reduce the friction between the valve shaft 40 and the valve body 30 or the friction between the valve shaft 40 and the sealing member 50. At the same time, the upper groove wall 601 of the oil storage groove 60 can push the lubricating oil on the outer circumferential surface of the valve shaft 40 into the oil storage groove 60.

The valve structure comprising the oil-retaining mechanism can not only be applied to a water outflow device comprising a water passage, but can also be applied to any product comprising the valve structure, for example, an air outlet device comprising an air passage, and is not limited thereto.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An oil-retaining mechanism, comprising:
    a valve body,
    a valve shaft, and
    a sealing member, wherein:
       the valve body comprises a motion cavity,
       the valve shaft is disposed in the motion cavity,
       the valve shaft is at least configured to move axially in the motion cavity,
       the sealing member is disposed between a cavity wall of the motion cavity and the valve shaft,
       at least one of the cavity wall of the motion cavity, the sealing member, or a connection portion of the motion cavity, the sealing member, and the valve shaft extends inward to define an oil storage groove,
       the oil storage groove comprises an opening,
       an inner side of the opening stores lubricating oil,
       the opening cooperates with and contacts an outer circumferential surface of the valve shaft, and
       when the valve shaft moves in the motion cavity, the lubricating oil lubricates the valve shaft.

2. The oil-retaining mechanism according to claim 1, wherein:
    the oil storage groove comprises an upper groove wall and a lower groove wall,
    the opening is defined between the upper groove wall and the lower groove wall,
    when the valve shaft moves upward along the motion cavity:
       the upper groove wall pushes the lubricating oil from the outer circumferential surface of the valve shaft into the oil storage groove, and
    when the valve shaft moves downward along the motion cavity:
       the lower groove wall pushes the lubricating oil from the outer circumferential surface of the valve shaft into the oil storage groove.

3. The oil-retaining mechanism according to claim 2, wherein:
    a cross section of the oil storage groove is a closed annular structure, and
    the opening has a closed annular shape.

4. The oil-retaining mechanism according to claim 3, wherein a longitudinal section of the oil storage groove has a circle shape, a triangle shape, a square shape, a diamond shape, a trapezoid shape, or an ellipse shape.

5. A valve structure, comprising:
    the oil-retaining mechanism according to claim 4, and
    a valve fixed portion, wherein:
       the valve fixed portion comprises an assembly cavity,
       the valve body is disposed on the assembly cavity, and
       the valve shaft is configured to move relative to the valve fixed portion.

6. A valve structure, comprising:
    the oil-retaining mechanism according to claim 3, and
    a valve fixed portion, wherein:
       the valve fixed portion comprises an assembly cavity,
       the valve body is disposed on the assembly cavity, and
       the valve shaft is configured to move relative to the valve fixed portion.

7. A valve structure, comprising:
    the oil-retaining mechanism according to claim 2, and
    a valve fixed portion, wherein:
       the valve fixed portion comprises an assembly cavity,
       the valve body is disposed on the assembly cavity, and
       the valve shaft is configured to move relative to the valve fixed portion.

8. The oil-retaining mechanism according to claim 1, wherein:
    the motion cavity comprises a step surface laterally disposed,
    the step surface divides the motion cavity into a large cavity and a small cavity,
    a bottom end of the valve shaft passes through the motion cavity and extends out of the motion cavity,
    the sealing member is disposed between an inner wall of the large cavity and the valve shaft, and
    the oil storage groove is disposed on the stepped surface.

9. A valve structure, comprising:
    the oil-retaining mechanism according to claim 8, and
    a valve fixed portion, wherein:
       the valve fixed portion comprises an assembly cavity,
       the valve body is disposed on the assembly cavity, and
       the valve shaft is configured to move relative to the valve fixed portion.

10. A valve structure, comprising:
    the oil-retaining mechanism according to claim 1, and
    a valve fixed portion, wherein:
       the valve fixed portion comprises an assembly cavity,
       the valve body is disposed on the assembly cavity, and
       the valve shaft is configured to move relative to the valve fixed portion.

11. The valve structure according to claim 10, further comprising:
   a reset elastic member, wherein:
      the reset elastic member is disposed in the assembly cavity, and
      two ends of the reset elastic member are respectively connected to a bottom wall of the assembly cavity and the valve shaft.

12. A water outflow device comprising the valve structure according to claim 11.

13. A water outflow device comprising the valve structure according to claim 10.

\* \* \* \* \*